Figure 1:
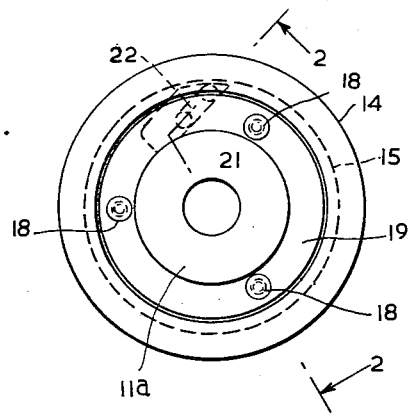

Dec. 18, 1962  B. V. DAVIS  3,068,714
NUT AND SCREW DRIVE DEVICE OF THE RECIRCULATING BALL TYPE
Filed Oct. 3, 1960

INVENTOR
BERNARD VICTOR DAVIS
BY Whittemore, Hulbert
& Belknap
ATTORNEYS

United States Patent Office 3,068,714
Patented Dec. 18, 1962

3,068,714
NUT AND SCREW DRIVE DEVICE OF THE RECIRCULATING BALL TYPE
Bernard Victor Davis, Millbern, Willoughby, England, assignor to National Broach And Machine Co., Detroit, Mich., a corporation of Michigan
Filed Oct. 3, 1960, Ser. No. 60,110
1 Claim. (Cl. 74—459)

The invention of this application is cognate with that according to my prior patent application Serial No. 3,354 filed January 19, 1960 which relates to a nut and screw drive of the recirculating ball type.

In accordance with my said prior application a nut and screw drive device of the circulating ball type has the nut body provided with an eccentrically-arranged, longitudinal, ball-transfer duct merging at its ends into laterally-extending ducts which intercept tangentially the end turns of the helical half-track for the balls in the nut, the axial ends of the latter being provided interiorly with reversibly acting means for diverting the balls serially from the said end turn, at the end of the nut through which the screw emerges during relative rotation, through the associated tangential duct and into the adjacent end of the longitudinal duct, and for diverting the balls serially from the opposite end of the longitudinal duct, through the other tangential duct, into the said end turn at the end of the nut where the screw enters during said relative rotation.

It has now been found that the ball-transfer duct can just as well be formed in the screw as in the nut.

According to the present invention, therefore, a nut and screw drive device, of the circulating ball type, has one of these elements provided with an eccentrically-arranged, longitudinal, ball-transfer duct merging at its ends into laterally-extending ducts which intercept the adjacent turns of the helical half-track for the balls in the other element, and the said intercepting ends of the laterally-extending ducts are associated with reversibly acting means which, according to the direction of relative rotation of the nut and screw, divert the balls serially from one said adjacent turn of the said other element to pass through the associated laterally-extending duct and into the adjacent end of the longitudinal duct, and divert the balls serially from the opposite end of the longitudinal duct to pass through the other laterally-extending duct and into the other said adjacent turn of the said other element.

In the case where the longitudinal duct is provided in the screw, each of the laterally-extending ducts is, according to a further feature, jointly formed by surfaces at the adjacent end of the helical half-track of the screw and in a part located by a detachable, coaxial collar fast with the screw, the said part being formed with the reversibly acting means.

Figure 2:
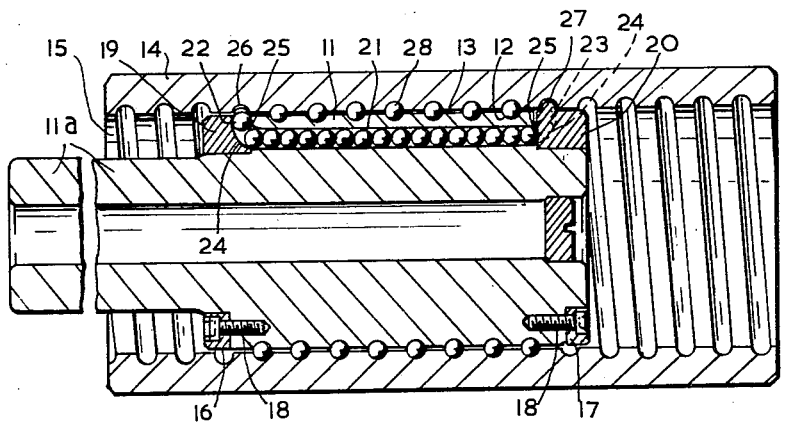

One embodiment of the drive, in which the longitudinal duct is provided in the screw, is illustrated by the accompanying drawings, in which:

FIGURE 1 is an end elevation,
FIGURE 2 is a section on the line 2—2 of FIGURE 1.

Referring to the drawings, the screw 11 is formed integrally with, and intermediate the ends of a shaft 11a of smaller diameter, and it has a helical half-track 12, of semi-circular cross-section, of which the turns are separated by flat-topped lands 13. The nut 14, which is considerably longer than the screw in the example shown, is in the form of a sleeve interiorly provided with the complementary half-track 15.

Each end of the screw 11 has an axially stepped face 16 or 17 against which is held, by screws 18, respective collars 19 and 20 which are a sliding fit on shaft 11a and have coacting axial steps for engaging the said ends of the screw to provide relative angular location. Obviously, the tapped holes for the screws 18 are formed after the collars are correctly located by the steps.

The screw is provided with a longitudinal duct 21 which extends through the faces 16 and 17, and these faces and the adjacent ends of the collars 19 and 20 are jointly formed with laterally-extending ducts, 22 and 23 respectively. The collars and the faces 16 and 17 are curved, as indicated respectively at 24 and 25, for providing a smooth elbow between the duct 21 and the ducts 22 and 23.

At its end remote from the duct 21, each of the ducts 22 and 23 is continued, at one side of a radial plane of the device, by a nose 26 or 27 of the associated collar 19 or 20. These noses are scoop-like and extend into the half-track in the nut, facing in opposite directions.

When the nut and screw are relatively rotated for overcoming an end load, the nose 26 or 27, according to the direction of the relative rotation, will scoop up the balls 28 in succession from the half-track 15 in the nut and divert them into the associated laterally-extending duct 22 or 23 and hence into the adjacent end of the longitudinal duct 21. At the same time the balls in the longitudinal duct will be pushed out of its opposite end and into the other laterally-extending duct, and the nose associated with the latter will feed the balls back into the adjacent turn of the half-track 15.

It will be seen that the method of constructing the screw will enable them to be made of appropriate load-ratings from bar stock provided with the half-tracks 12. All it is necessary to do is to turn down the stock to provide the shaft 11a and a sufficient length of screw 11 for the designed load. The stepped faces 16 and 17 are afterwards machined, and the collars 19 and 20, which are not "handed" can be selected from a common stock.

What I claim is:

A drive mechanism of the recirculating ball type comprising a nut member of substantially circular cross-section which is provided with an internal helical groove, a tubular screw member of substantially circular cross-section extending through said nut member with clearance therebetween, said screw member including a complementary external helical groove which is adapted to cooperate with the helical groove in said nut member to form a helical guideway of substantially circular cross-section, portions of said screw member being reduced in diameter to form a pair of axially spaced, outwardly facing shoulders on the outer periphery of said screw member, a pair of annular collars seated on the reduced portions of said screw member, said collars having an outside diameter substantially equal to the diameter of said screw member intermediate said shoulders, said collars also having faces opposite from and abutting said shoulders, a longitudinally extending ball return passage of circular cross-section in said screw member and having an axis parallel to and spaced radially from the axis of said screw member, laterally extending channels jointly formed in the faces of said collars and in the walls of said shoulders which co-operate to form laterally extending substantially curved passageways of substantially circular cross-section which gradually and smoothly intersect on one end the ends of said ball return passage and intersect on the other end the aforesaid helical guideway, a plurality of threaded fasteners between said collars and said screw member for maintaining the faces of said collars in surface-to-surface contact with the shoulders on said screw member, and a substantially continuous endless row of balls extending through the return passage, its laterally extending passageways and round the helical guideway.

References Cited in the file of this patent

UNITED STATES PATENTS

| | | |
|---|---|---|
| 477,642 | Brunthauer | June 28, 1892 |
| 2,127,335 | Hodgson | Aug. 16, 1938 |
| 2,398,789 | Hoffar | Apr. 23, 1946 |
| 2,450,282 | Jackson | Sept. 28, 1948 |
| 2,486,055 | Mort et al. | Oct. 25, 1949 |
| 2,890,594 | Galonska | June 16, 1959 |
| 2,975,649 | Propst | Mar. 21, 1961 |

FOREIGN PATENTS

| | | |
|---|---|---|
| 54,350 | Netherlands | Apr. 15, 1943 |
| 607,912 | Great Britain | Sept. 7, 1948 |
| 815,730 | Great Britain | July 1, 1959 |